(12) United States Patent
La Torre

(10) Patent No.: US 11,116,176 B1
(45) Date of Patent: Sep. 14, 2021

(54) WASTE COLLECTION PAD FOR COLLECTING BODILY WASTE OF A PET

(71) Applicant: Louis La Torre, Hazlet, NJ (US)

(72) Inventor: Louis La Torre, Hazlet, NJ (US)

(*) Notice: Subject to any disclaimer, the term of this patent is extended or adjusted under 35 U.S.C. 154(b) by 255 days.

(21) Appl. No.: 16/268,802

(22) Filed: Feb. 6, 2019

(51) Int. Cl.
| | |
|---|---|
| *A01K 1/015* | (2006.01) |
| *B32B 5/02* | (2006.01) |
| *B32B 27/12* | (2006.01) |
| *B32B 27/32* | (2006.01) |
| *B32B 7/12* | (2006.01) |

(52) U.S. Cl.
CPC ............ *A01K 1/0157* (2013.01); *B32B 5/022* (2013.01); *B32B 7/12* (2013.01); *B32B 27/12* (2013.01); *B32B 27/32* (2013.01); *B32B 2555/00* (2013.01)

(58) Field of Classification Search
CPC .... A01K 1/0107; A01K 1/0157; B32B 5/022; B32B 7/12; B32B 27/12; B32B 27/32; B32B 2555/00
See application file for complete search history.

(56) References Cited

U.S. PATENT DOCUMENTS

| | | | | |
|---|---|---|---|---|
| 3,626,900 | A * | 12/1971 | Failla | .................. A01K 1/0107 |
| | | | | 119/161 |
| 9,750,224 | B2 | 9/2017 | Kupka | |
| 2004/0255869 | A1 | 12/2004 | Matsuo et al. | |
| 2013/0068169 | A1 | 3/2013 | Miller | |
| 2013/0098301 | A1 | 4/2013 | Matsuo et al. | |
| 2014/0261208 | A1* | 9/2014 | Calimano | ............ A01K 1/0157 |
| | | | | 119/161 |
| 2019/0223405 | A1* | 7/2019 | Komatsubara | ....... A01K 1/0157 |
| 2020/0187451 | A1* | 6/2020 | Onishi | ................. A01K 1/0107 |

* cited by examiner

*Primary Examiner* — Joshua J Michener
*Assistant Examiner* — Brittany A Lowery
(74) *Attorney, Agent, or Firm* — Sanchelima & Associates PA; Christian Sanchelima; Jesus Sanchelima

(57) ABSTRACT

A waste collection pad for collecting bodily waste of a pet is disclosed. The waste collection pad comprises a first sheet made up of a permeable material. The first sheet is provided with a lining at sides. The lining is made up of non-permeable material. The waste collection pad comprises a second sheet provided under the first sheet. The second sheet is made up of non-permeable material. Further, the waste collection pad comprises a third sheet of the second sheet. The third sheet is made up of permeable and non-permeable material. The first sheet collects bodily waste of the pet and absorbs the bodily waste. The third sheet collects excess bodily waste flowing out of the first sheet, and the second sheet prevents spread of the bodily waste over a surface.

9 Claims, 2 Drawing Sheets

WASTE COLLECTION PAD FOR COLLECTING BODILY WASTE OF A PET

BACKGROUND OF THE INVENTION

Field of the Invention

The present disclosure relates to a field of pet products. More specifically, the present disclosure relates to a waste collection pad comprising an absorbent sheet and another sheet, which is partially absorbent, used for collecting pet waste and urination.

Description of the Related Art

It is known many people keep pets or companion animals at house. Most popular pets include dogs and cats among other animals. People may keep the pets for variety of reasons such as for person's company, protection, or entertainment. It is known that hygiene of the pets is very important for the pets and also for the people staying at the house. For example, it is important to keep away fecal matter and urination of the pets so that the pets or the members of the house do not come in contact with it. Typically, a member of the house may take the pet outdoors so that the pet may discharge the fecal matter and urinate. Further, alternate arrangements may be made at house so that the pet may discharge the fecal matter and urination at a designated area when the members of the house are not at home.

In order to make the pet to discharge the fecal matter and urinate at the designated area, the pet needs to be trained. Even after training, the pet may still discharge in the house and soil floor, mats, beds, sofa and so on. It is very inconvenient to clean the floors, sofas when it is soiled with the fecal matter and urination. This problem is even worse if the pet has a medical condition or if the pet is old or sick.

In order to overcome the problems of pet soiling the house, several solutions have been provided in the past. One such solution includes providing an animal litter box, which the pet can use to evacuate urine or fecal matter.

An example of an animal litter box system is disclosed in a United States patent application 20040255869. In US20040255869, an animal litter box system that can be used for a long time is disclosed. The animal litter box system comprises a liquid-absorbing sheet, which is used to prevent the occurrence of undesirable odors.

Another example is disclosed in a United States patent application 20130068169. In US20130068169, a pet waste collection apparatus having a drawstring within an outer peripheral border is disclosed. The pet waste collection apparatus comprises a substantially leak proof absorbent pad, which may be placed on a surface for receiving and collecting excrement and/or urine from the animal, dog, or other pet, that can be easily formed into a bag by pulling a drawstring taut, when a sufficient amount of excrement and/or urine is collected.

Another example is disclosed in a United States patent application 20130098301. In US20130098301, a liquid-permeable panel for animals is disclosed. The liquid-permeable panel prevents urine wetting resulting from torsion or folding over of a pee pad.

Yet another example is disclosed in a United States patent application 20140299068. In US20140299068A1, a waste receptacle that allows a dog to simulate the experience of urinating outdoors in indoor environment is disclosed.

Although the above disclosures are helpful in collecting and clearing the fecal matter and urination, they have certain disadvantages. For example, the animal litter boxes or the receptacles have to be cleaned after disposing off the waste i.e., the fecal matter collected in them. Further, since the animal litter boxes allow keeping the waste for a long time, it might create an unpleasant environment at indoors.

Other documents describing the closest subject matter provide for a number of more or less complicated features that fail to solve the problem in an efficient and economical way. None of these patents suggest the novel features of the present invention. Specifically, none of the disclosures in the art disclose a waste collection pad comprising two sheets, one sheet that is permeable capable of absorbing liquid and other sheet which is partially permeable.

Therefore, there is a need in the art for a waste collection pad for collecting bodily waste of a pet, the waste collection pad comprising two sheets, one sheet that is permeable capable of absorbing liquid and other sheet, which is partially permeable.

SUMMARY OF THE INVENTION

It is one of the main objects of the present invention to provide a waste collection pad for collecting bodily waste of a pet and avoids the drawbacks of the prior art.

It is one object of the present invention to provide a waste collection pad comprising two sheets, one sheet that is permeable capable of absorbing liquid and other sheet which is partially permeable.

It is one object of the present invention to provide a waste collection pad for collecting bodily waste of a pet. The waste collection pad comprises a first sheet made up of a permeable material. The first sheet is provided with a lining at sides. The lining is made up of non-permeable material. The waste collection pad comprises a second sheet provided under the first sheet. The second sheet is made up of non-permeable material. Further, the waste collection pad comprises a third sheet provided at center of the second sheet. The third sheet is made up of permeable material. The first sheet collects bodily waste of the pet and absorbs the bodily waste. The third sheet collects excess bodily waste flowing out of the first sheet, and the second sheet prevents spread of the bodily waste over a surface.

It is another object of the present invention to provide a waste collection pad that allows to keep surface hygiene and clean and can be disposed off after use.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a waste collection pad for collecting bodily waste of a pet. The waste collection pad comprises a first sheet made up of a permeable material. The first sheet is provided with a lining at sides. The lining is made up of non-permeable material. The waste collection pad comprises a second sheet provided under the first sheet. The second sheet is made up of non-permeable material. Further, the waste collection pad comprises a third sheet provided at center of the second sheet. The third sheet is made up of permeable material. The first sheet collects bodily waste of the pet and absorbs the bodily waste. The third sheet collects excess bodily waste flowing out of the first sheet, and the second sheet prevents spread of the bodily waste over a surface.

Various features and embodiments of a waste collection pad for collecting bodily waste of a pet explained in conjunction with the description of FIGS. 1-5.

Figure 1:
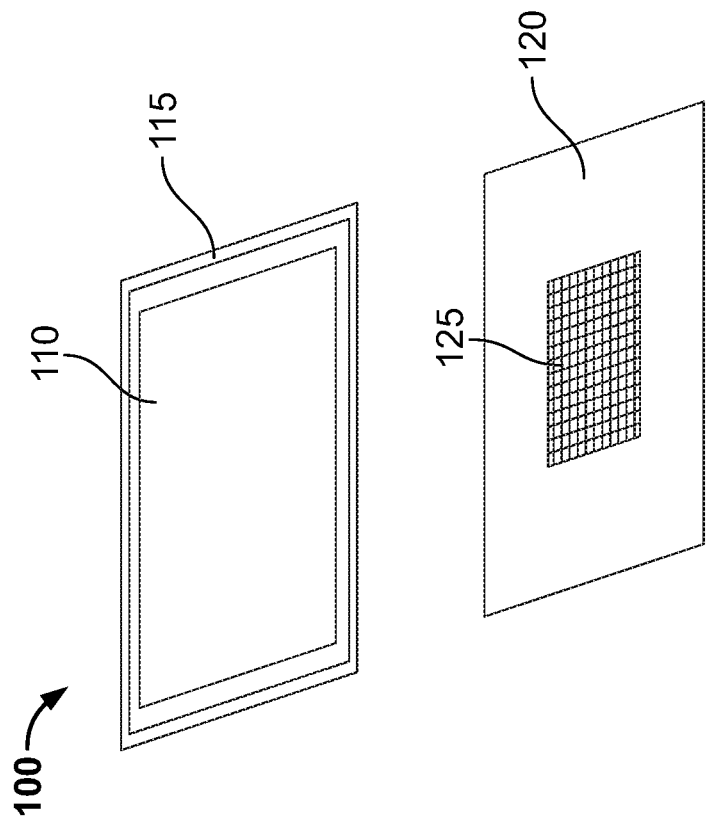
FIG. 1 illustrates an exploded view of a waste collection pad 100, in accordance with one embodiment of the present disclosure.

Referring to FIG. 1, an exploded view of a waste collection pad 100 is shown, in accordance with one embodiment of the present disclosure. The waste collection pad 100 comprises a first sheet or first layer 110. In one example, the first sheet 110 is made up of a nonwoven fabric having absorbent properties. In another example, the first sheet 110 is made up of a polymer absorbent material. In another example, the first sheet 110 is made up of an absorbent paper. In one example, the absorbent paper may include a tissue paper. In other words, the first sheet 110 is made up of a permeable material.

Figure 2:
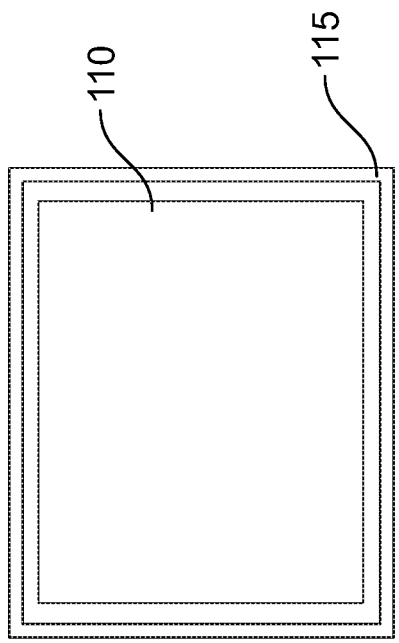
FIG. 2 illustrates a top view of a first sheet 110 of the waste collection pad 100, in accordance with one embodiment of the present disclosure.

In one implementation, the first sheet 110 comprises a lining 115 made up of plastic or non-absorbent material. Referring to FIG. 2, a top view of the first sheet 110 comprising the lining 115 at corner or border of the first sheet 110. The lining 115 may be provided around the first sheet 110 such that the lining 115 prevents liquid absorbed by the first sheet 110 from spreading out.

Width of the lining 115 at the sides or edges may be selected based on need e.g., based on size or breed of a pet. The lining 115 is provided at the sides such that when excess liquid, which is not absorbed by the first sheet 110 flows out, the excess liquid is contained with the help of the lining 115.

Further, the waste collection pad 100 comprises a second sheet 120, as shown in FIG. 1. In one example, the second sheet 120 is made up of a plastic or polyethylene film. In other words, the second sheet 120 is made up of an impermeable or non-permeable material. In one embodiment, the second sheet 120 is provided with an absorbent material at the sides and the center portion is provided with impermeable material.

As can be seen in FIG. 1, the second sheet 120 comprises a third sheet 125 made up of nonwoven fabric having absorbent properties such as an absorbent paper. In one example, the absorbent paper may include a tissue paper.

Figure 3:
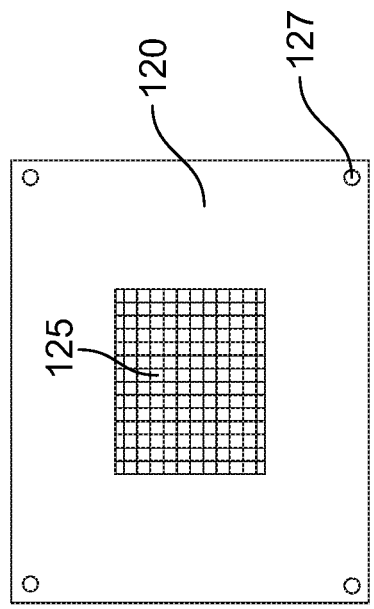
FIG. 3 illustrates a bottom view of a second sheet 120 of the waste collection pad 100, in accordance with one embodiment of the present disclosure.

Further, the second sheet 120 may comprise a plurality of adhesive portions 127 at the bottom. Referring to FIG. 3, a bottom view of the second sheet 120 comprising the plurality of adhesive portions 127 at the bottom is shown, in accordance with one embodiment of the present disclosure. The adhesive portions 127 may be provided at sides or corners of the second sheet 120 such that the second sheet 120 may be coupled to ground or surfaces when the second sheet 120 is placed. Although it is shown that the adhesive portions 127 are provided at corners of the second sheet 120, it is obvious to a person skilled in the art to provide adhesive portions 127 at sides extending over the length of the second sheet 120.

Figure 4:
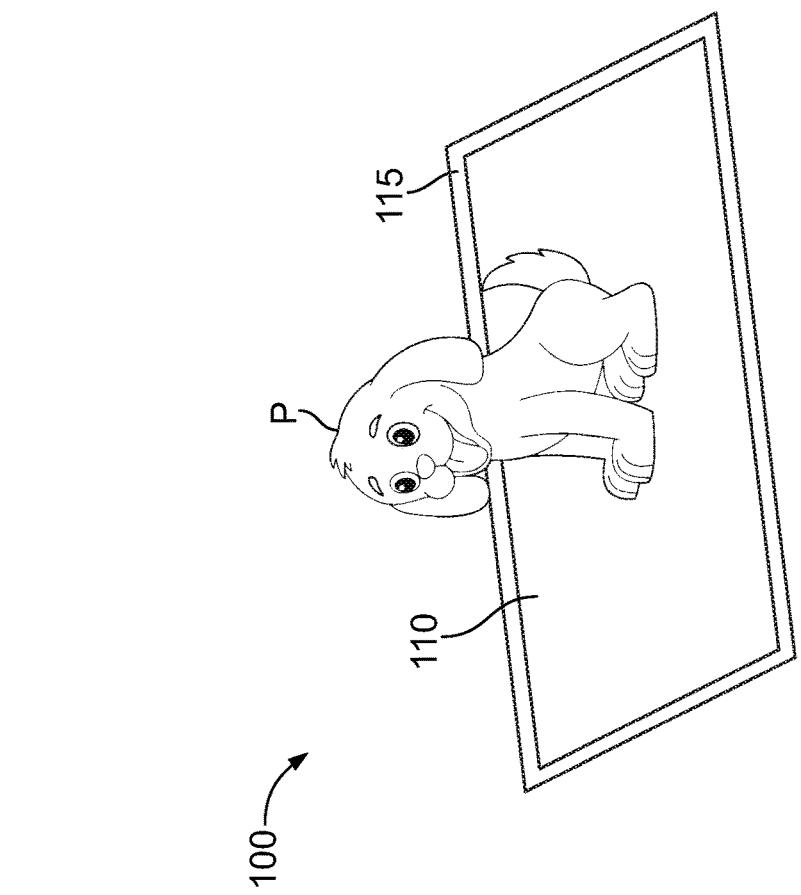
FIG. 4 illustrates a schematic diagram of the waste collection pad 100 for collecting bodily waste of a pet P, in accordance with one embodiment of the present disclosure.

Now referring to FIG. 4, use of the waste collection pad 100 is explained. At first, a pet P is made to sit or stand on the waste collection pad 100 i.e., on the first sheet 110. The pet P may include a dog, a cat and other animal. Subsequently, the pet P may release bodily waste, for example the pet P may urinate or release a fecal matter on the first sheet 110. It should be understood that at first, the waste collection pad 100 might be placed on ground or flat surface such as a table. Specifically, the second sheet 120 might be placed on ground such that the adhesive portions 127 are used to attach the waste collection pad 100 to the ground. The first sheet 110 and the second sheet 120 may be coupled using adhesive or sewn together.

When the pet P sits on the waste collection pad 100 and releases the bodily waste, then it is collected at the first sheet 110. Due to absorption properties of the first sheet 110, the urine is collected i.e., absorbed by the first sheet 110. Amount of the urine i.e., that the first sheet 110 can absorb may depend on the type of material and size of the first sheet 110. If the urine collected is more, then excess urine flows onto the second sheet 120. The third sheet 125 provided at the second sheet 120 may collect excess liquid flowing out from the first sheet 110. Due to non-absorbent properties of the second sheet 120, the bodily waste or urination is made to stay within the third sheet 125.

Due to excess amount of urination, even if urination flows out of first sheet 110 and then onto to third sheet 125, the urine is made to stay beneath the third sheet 125, as the second sheet 120 prevents it from flowing beyond the area of the third sheet 125. This way, spreading of the urination on the floor is avoided and house may be kept clean.

In one implementation, the first sheet 110 is made up of a padded or a cushion material such that the pet P while sitting on the first sheet 110 is made to feel comfortable.

In one exemplary implementation, the first sheet 110 is provided with a fragrance or scent. The pet P may sense the fragrance emitting from the first sheet 110 and get induced to sit or stand on the waste collection pad 100 i.e., the first sheet 110 and release the bodily waste.

In one example, after collecting the bodily waste, the waste collection pad 100 may be disposed off. In one example, only the first sheet 110 may be disposed off after use and another first sheet 110 may be used. The second sheet 120 may be used for a long period depending on the waste collected at the second sheet 120.

Figure 5:
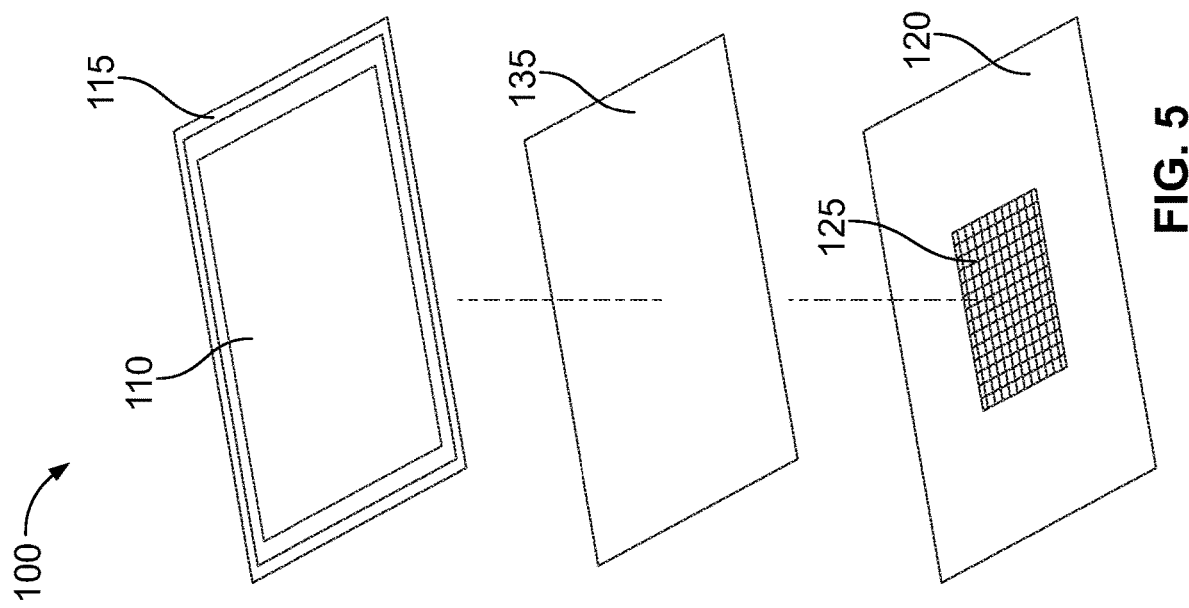
FIG. 5 illustrates an exploded view of the waste collection pad 100 comprising a fourth sheet 135, in accordance with one exemplary embodiment of the present disclosure.

Referring to FIG. 5, the waste collection pad 100 may be provided with an additional layer of absorbent material between the first sheet 110 and the second sheet 120 to absorb more amount of urination. As can be seen, the waste collection pad 100 may be provided with a fourth sheet or mid-layer 135 made up of an absorbent material such as an absorbent paper. The fourth sheet 135 may absorb excess urination flowing out from the first sheet 110 and reduce or avoid flow of urination onto the second sheet 120 or the third sheet 125.

It is evident from the above disclosure that the waste collection pad can be used to collect bodily waste of the pet and the waste collection pad can be disposed off. Further, the absorbent material is provided at the first sheet, so that the pet can sit or stand anywhere on the waste collection pad and release the bodily waste. If the bodily waste is solid i.e., fecal matter, then the bodily waste is collected by the first sheet. Further, if the bodily waste is liquid i.e., urine, then the bodily waste is absorbed by the first sheet and then by the absorbent material i.e., third sheet provided at the second sheet. After collecting or absorbing the waste, the waste collection pad may be disposed off. As the waste collection pad is disposed off after every use, the floor of the house is kept clean and hygiene is maintained at the house.

Further, it should be understood that the waste collection pad may be used to train the pet to discharge bodily waste by placing the waste collection pad at a certain place in the house so that whenever the pet needs to discharge bodily waste, the pet can walk up to the waste collection pad and discharge the bodily waste.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A waste collection pad for collecting bodily waste of a pet, the waste collection pad comprising:
   a first sheet made up of a permeable material, wherein said first sheet is made of a nonwoven fabric having absorbent properties, wherein said first sheet further includes a lining being made of a plastic material, wherein said lining is non-absorbent, wherein said lining is provided around an entire outer perimeter border of said first sheet, wherein said lining is adapted to prevent liquid absorbed by said first sheet from spreading out, wherein said first sheet further includes padding;
   a second sheet placed under the first sheet, wherein said second sheet is made of a polyethylene film, wherein said second sheet is non-permeable, wherein said second sheet includes a bottom side and a top side, wherein said bottom side includes adhesive portions, wherein said adhesive portions are coupled to a ground surface, wherein said first sheet is layered over said second sheet at the top side of the second sheet; and
   a third sheet provided at center of the second sheet, wherein said third sheet is framed within said second sheet, said third sheet having an area that is less than an area of said second sheet, wherein said third sheet is made of a nonwoven fabric having absorbent properties, wherein said third sheet is sandwiched between said second sheet and said first sheet, wherein said third sheet is exposed from said bottom side of said second sheet.

2. The waste collection pad of claim 1, wherein the second sheet includes a plastic material.

3. The waste collection pad of claim 1, wherein the first sheet comprises a fragrance embodied therein.

4. The waste collection pad of claim 1, wherein the waste collection pad is disposable.

5. The waste collection pad of claim 1, further comprises a fourth sheet provided between the first sheet and the second sheet.

6. The waste collection pad of claim 1, wherein said fourth sheet is made of an absorbent paper material.

7. The waste collection pad of claim 1, wherein said adhesive portions are disposed at each of four corners of said second sheet.

8. The waste collection pad of claim 1, wherein said third sheet includes a gridded pattern.

9. A waste collection pad, consisting of:
   a) a first sheet having a rectangular shape, wherein said first sheet is made of a nonwoven fabric having absorbent properties, wherein said first sheet is permeable, wherein said first sheet further includes a lining being made of a plastic material, wherein said lining is non-absorbent, wherein said lining is provided around an entire outer perimeter border of said first sheet, wherein said lining is adapted to prevent liquid absorbed by said first sheet from spreading out, wherein said first sheet includes a fragrance infused thereon, wherein said first sheet further includes padding;
   b) a second sheet having a rectangular shape, wherein said second sheet is made of a polyethylene film, wherein said second sheet is non-permeable, wherein said second sheet includes a bottom side and a top side, wherein said bottom side includes adhesive portions, said adhesive portions being disposed at each of four corners of said second sheet, wherein said adhesive portions are coupled to a ground surface, wherein said first sheet is layered over said second sheet at the top side of the second sheet;
   c) a third sheet having a rectangular shape, wherein said third sheet is framed within said second sheet, said third sheet having an area that is less than an area of said second sheet, wherein said third sheet is made of a nonwoven fabric having absorbent properties, wherein said third sheet is sandwiched between said second sheet and said first sheet, wherein said third sheet includes a gridded pattern, wherein said third sheet is exposed from said bottom side of the second sheet; and
   d) a fourth sheet having a rectangular shape, wherein said fourth sheet is made of an absorbent paper material, wherein said fourth sheet is sandwiched between said third sheet and said first sheet.

\* \* \* \* \*